United States Patent
Mochizuki et al.

(10) Patent No.: US 7,342,700 B2
(45) Date of Patent: Mar. 11, 2008

(54) OPTICAL SCANNING APPARATUS AND IMAGE FORMING APPARATUS

(75) Inventors: Takeshi Mochizuki, Ibaraki (JP); Satoru Wada, Ibaraki (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 0 days.

(21) Appl. No.: 11/322,264

(22) Filed: Jan. 3, 2006

(65) Prior Publication Data

US 2006/0176534 A1    Aug. 10, 2006

(30) Foreign Application Priority Data

Feb. 4, 2005    (JP) ............................ P2005-029190

(51) Int. Cl.
*G02B 26/08* (2006.01)

(52) U.S. Cl. ...................................... 359/205

(58) Field of Classification Search ......... 359/204–208
See application file for complete search history.

(56) References Cited

U.S. PATENT DOCUMENTS 5,969,346 A * 10/1999 Nagasaka et al. ........... 250/234
6,873,466 B2 * 3/2005 Hama et al. ................. 359/216
6,965,466 B2 * 11/2005 Ishihara ...................... 359/212

FOREIGN PATENT DOCUMENTS

| JP | 5-35904 | 2/1993 |
|---|---|---|
| JP | 5-164988 | 6/1993 |
| JP | 7-72402 | 3/1995 |
| JP | 7-72404 | 3/1995 |
| JP | 7-72405 | 3/1995 |
| JP | 8-15634 | 1/1996 |
| JP | 8-334710 | 12/1996 |
| JP | 2001-154130 | 6/2001 |

* cited by examiner

*Primary Examiner*—Euncha P. Cherry
(74) *Attorney, Agent, or Firm*—McGinn IP Law Group, PLLC

(57) ABSTRACT

An optical scanning apparatus includes a deflecting member that deflects and scans a light beam emitted from a light source, an optical element that scans and images the light beam on a medium to be scanned; and an opening member being disposed in a vicinity of the medium to be scanned. The opening member restricts both a scanning direction of the scanned and imaged light beam and a direction perpendicular to the scanning direction of the light beam.

17 Claims, 3 Drawing Sheets

OPTICAL SCANNING APPARATUS AND IMAGE FORMING APPARATUS

BACKGROUND OF THE INVENTION

1. Field of the Invention

The present invention relates to an optical scanning apparatus, and also to an image forming apparatus comprising such an optical scanning apparatus.

2. Description of the Related Art

In recent image forming apparatuses such as a laser printer, increase of the dot density is advancing. It becomes necessary to reduce the diameter of a light beam which is to be imaged on a medium to be scanned of an optical scanning apparatus used in such an image forming apparatus. A beam in which the intensity distribution is approximated by the Gaussian distribution is often used as a scanning beam. The focal depth is drastically reduced in accordance with the reduction of the diameter of an imaging light beam. In consideration of limitation of design of flatness of an image forming plane, shape errors of components having the apparatus, temporal changes due to a temperature and vibrations, and the like, it is difficult to maintain stably and uniformly a minute diameter of the imaging light beam over the whole scan width.

Furthermore, a phenomenon occurs that the potential distribution is widened more than an imaging light beam by dispersion of charges in a photosensitive member used as a scanned plane medium. This is one of causes of the necessity of further reducing the diameter of the imaging light beam with respect to the required dot diameter.

SUMMARY OF THE INVENTION

A light beam in which the intensity distribution is approximated by a square of the 0th order Bessel distribution (hereinafter, such a beam is referred to as Bessel beam) is used as a scanning beam (for example, see JP-A-5-35904). According to a related art (JP-A-5-35904), a deep focal depth can be obtained even by a minute imaging light beam, and the stability is excellent. However, the relate art has a problem in that the light amount of a sidelobe formed outside the first dark ring is large.

In order to improve the above-problem, a slit which is elongated in the scanning direction is disposed in the vicinity of the medium to be scanned, and a portion of the sidelobe which exists in a direction perpendicular to the scanning direction (hereinafter, referred to as sub-scanning direction) is removed away, thereby attaining a considerable effect (see JP-A-7-72404).

However, a technique disclosed in JP-A-7-72404 has problems in that it has no effect on a sidelobe existing on the scanning line, and that it is hardly applied to a so-called multi-beam scanning system in which plural scanning lines are formed by one scanning.

A diameter of a Bessel beam is restricted by an aperture member which is located at a position conjugate to a medium to be scanned, thereby mitigating the influence of the light intensity on a sidelobe of the Bessel beam (see JP-A-7-72405).

When a diameter of the whole Bessel beam is reduced, a focal depth is decreased in proportion to the reduction. Consequently, there is a problem in that an advantage of the property of a Bessel beam that the focal depth is deep is not sufficiently taken.

As means for generating a Bessel beam, methods in which a circular slit and a lens are used, in which a hologram having a concentric circular fringe is used, and in which a conical axicon is used are known (for example, see JP-A-5-164988). In a method disclosed in JP-A-5-164988, intensity reduction due to light blocking or the diffraction efficiency, and the processing accuracy of the axicon remain to be solved.

it is known that a member having an opening such as a pinhole is disposed in an optical scanning apparatus, and vignetting is caused in a part of a light beam, thereby reducing the light beam diameter.

In an optical scanning apparatus using a hologram, an incident position of laser light is optimumly adjusted so that diffracted light passes through a pinhole disposed at a predetermined position and an optical detector produces an output (see JP-A-8-15634).

A pinhole array is disposed in front of a photoelectric converting element placed outside a medium to be scanned, the beam diameters in the main scanning direction and the sub-scanning direction are detected on the basis of the output of a light beam which has passed through a pinhole, and the beam waist position is controlled by moving a lens (see JP-A-8-334710).

A plurality of openings which are formed by shifting in a step-like shape, and the position in the sub-scanning direction is determined by detecting the amount of incident light (see JP-A-2001-154130).

In the above-related arts, the opening is not applied to the beam scanning the medium to be scanned, and an effect of reducing the imaging beam diameter on the medium to be scanned is not attained.

Because of the principle that the beam is scanned, the imaging beam is moved in the scanning direction for a specific time (usually, called the modulation time). This phenomenon and the above-mentioned reduction of the imaging beam diameter cause a problem that the diameter is asymmetric in the scanning direction and the sub-scanning direction.

According to an aspect of the invention, an optical scanning apparatus includes: a deflecting member that deflects and scans a light beam emitted from a light source; an optical element that scans and images the light beam on a medium to be scanned; and an opening member being disposed in a vicinity of the medium to be scanned. The opening member restricts both a scanning direction of the scanned and imaged light beam and a direction perpendicular to the scanning direction of the light beam.

According to the-above aspect of the invention, the imaging beam diameter can be reduced. The distance between the opening member and the medium to be scanned is restricted, whereby the influence of diffraction occurring when the beam is blocked can be suppressed within an allowable value. Furthermore, the diameter of the opening is equalized in the scanning direction and the sub-scanning direction, whereby asymmetry of the imaging beam which may occur when the beam is moved in the scanning direction can be suppressed.

BRIEF DESCRIPTION OF THE DRAWINGS

These and other objects and advantages of this invention will become more fully apparent from the following detailed description taken with the accompanying drawings in which.

DESCRIPTION OF THE EMBODIMENTS

Hereinafter, embodiments will be described with reference to the accompanying drawings.

Figure 2:
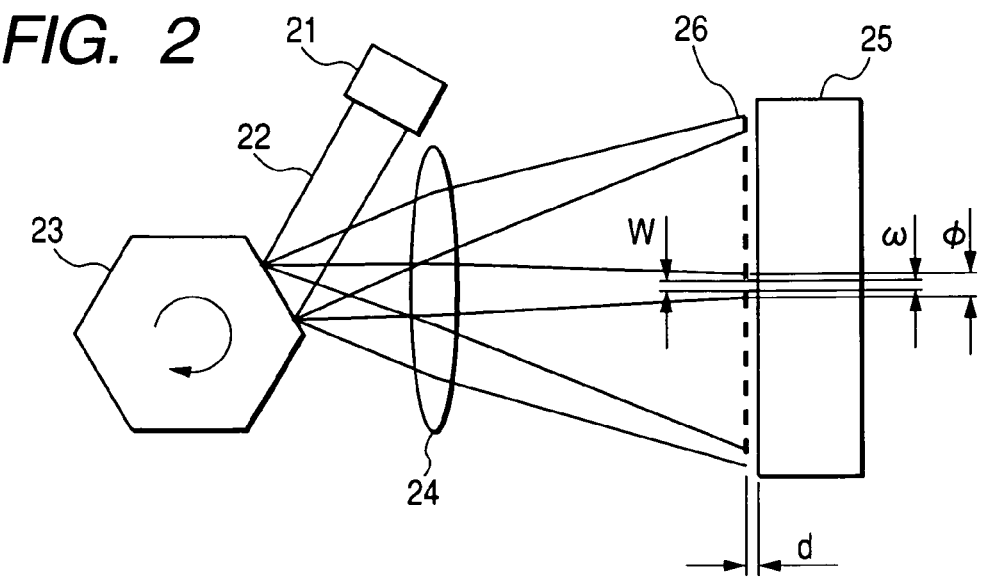
FIG. 2 is a diagram showing blocking of a light beam by a member having openings.

In FIG. 2, 21 denotes a light source, 22 denotes a light beam, 23 denotes light deflecting member, 24 denotes a scanning optical element, 25 denotes a medium to be scanned, and 26 denotes a member having openings. The light deflecting member 23 is configured by a rotary polygon mirror, the scanning optical element 24 by an Fθ lens, and the medium to be scanned 25 by a photosensitive drum.

The light beam 22 emitted from the light source 21 is deflected and scanned by the rotary polygon mirror (the light deflecting member 23), and then scanned and imaged onto the photosensitive drum (the medium to be scanned 25), by the Fθ lens (the scanning optical element 24). The member 26 having openings is placed in a vicinity of a face of the photosensitive drum, whereby the light beam 22 is subjected to a blocking action. Therefore, a diameter ω of the light beam reaching the photosensitive drum face 25 is smaller than a diameter φ of the light beam incident on the member 26 having openings. When the distance d between the member 26 having openings and the photosensitive drum face is sufficiently small, the beam diameter ω has a value which is sufficiently close to the diameter W of the openings.

Figure 3:
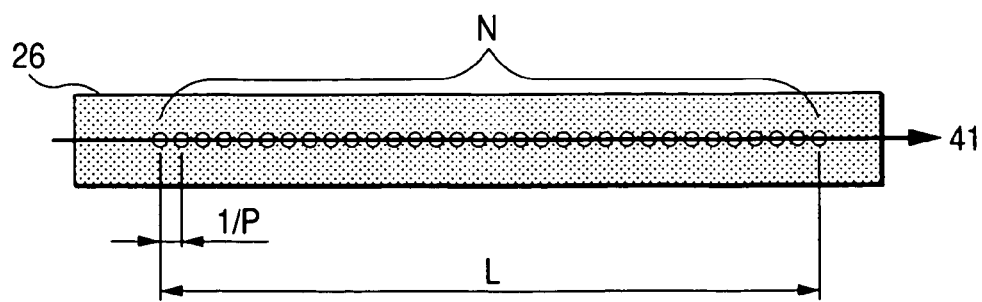
FIG. 3 is view showing an example of the member having openings.

FIG. 3 shows an example of the member 26 having openings. The reference numeral 41 indicates the position of the scanned beam. When the dot density is indicated by P, the distance between the openings in the main scanning direction is 1/P, and, when the scan width is indicated by L, and the total number of the openings is indicated by N, following expression (1) holds:

$$N=LP+1 \quad (1)$$

Namely, the openings correspond to the dots. The presence or absence of the second term of expression (1) depends on the definition of the scan width. It is considered that the term may sometimes be deleted.

Figure 4:
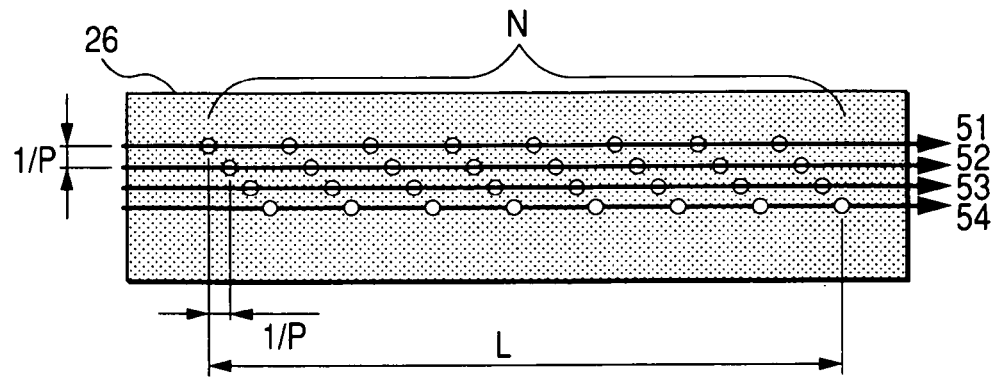
FIG. 4 is view showing an example of the member having openings.

FIG. 4 shows another example of the member 26 having openings. The reference numerals 51 to 54 indicate the positions of the scanned beam. The distances of the openings in both the main scanning direction and the sub-scanning direction are 1/P. When the number of beams is indicated by K and the number of rows along which the openings are arranged is indicated by M, following expression (2) holds:

$$K=M \quad (2)$$

The openings arranged in each row are scanned by corresponding one of the light beams. In FIG. 4, K=4 and M=4 are set. When the total number which is obtained by summing up the openings of the four rows is indicated by N, expression (1) holds. As shown in this example, when openings are arranged in plural rows, the distance between adjacent openings can be made longer, and hence the degree of freedom in selection of the diameter φ of the light beam incident on the member 26 having openings, and the diameter W of the openings is higher.

Figure 5:
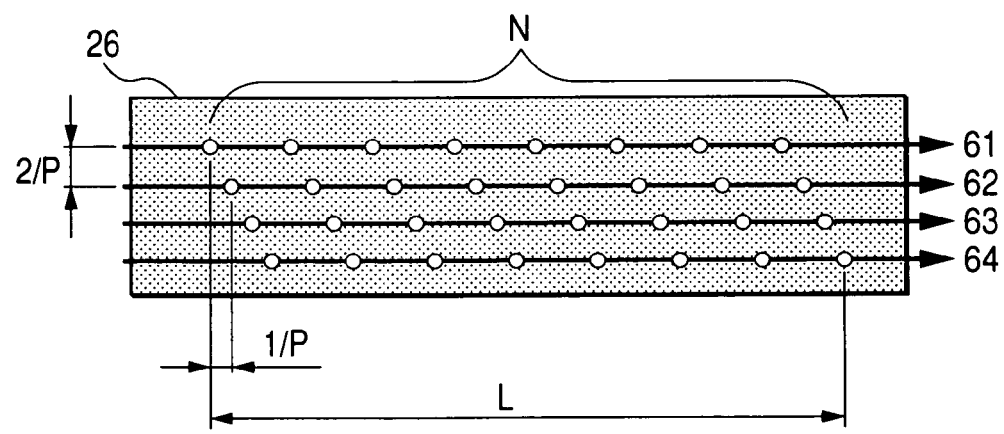
FIG. 5 is view showing an example of the member having openings.

FIG. 5 shows a further example of the member 26 having openings. The reference numerals 61 to 64 indicate the positions of the scanned beam. The distance in the main scanning direction is 1/P. When the distance in the sub-scanning direction is indicated by Su, expression (3) below holds. In FIG. 5, m=2 is set.

$$Su=m/P \quad (3)$$

When openings are arranged in plural rows, the distance of the rows is indicated by expression (3), and m is an integer of 2 or more, the distance between adjacent openings can be made longer as compared with the case of m=1. Therefore, the degree of freedom in selection of the diameter φ of the light beam incident on the member 26 having openings, and the diameter W of the openings is further higher.

Figure 6:
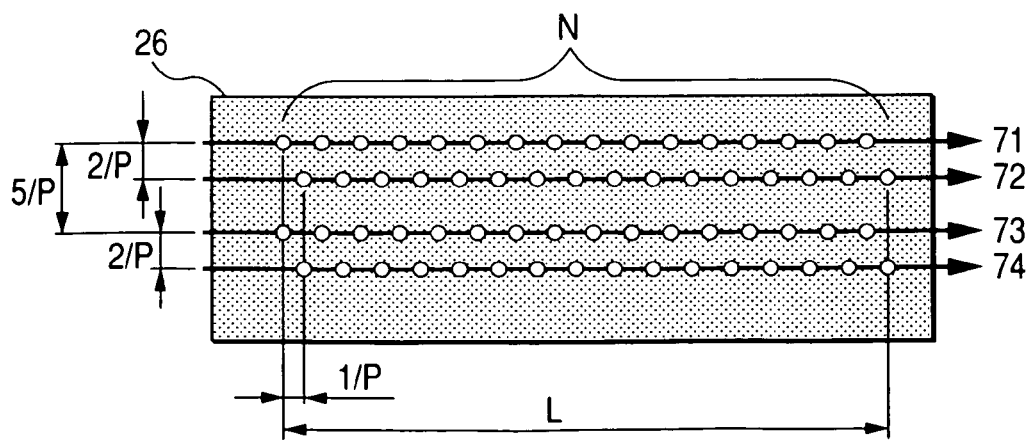
FIG. 6 is view showing an example of the member having openings.

FIG. 6 shows a still further example of the member 26 having openings. The reference numerals 71 to 74 indicate the positions of the scanned beam. When the scan width is indicated by L, the dot density is indicated by P, and the total number of the openings is indicated by N, following expression (4) holds:

$$N=\eta(LP+1) \quad (4)$$

where η is an integer of 2 or more. In FIG. 6, η=2 is set.

When the number of beams is indicated by K and the number of rows along which the openings are arranged is indicated by M, following expression (5) holds:

$$K=M \quad (5)$$

where J is an integer of 2 or more. In FIG. 6, J=2 is set.

The openings arranged in each row are scanned by corresponding one of the light beams. In FIG. 6, K=4 and M=4 are set. Furthermore, expression (6) holds:

$$M=J\eta \quad (6)$$

When the number of openings which are arranged in the member having the openings, and which have the same scanning-direction coordinate is indicated by I, following expression (7) holds:

$$I=\eta \quad (7)$$

The openings arranged in each row are scanned by corresponding one of the light beams. When openings which have the same scanning-direction coordinate exist as shown in FIG. 6, the openings are scanned by different light beams. Therefore, the configuration in which η is set to an integer of 2 or more is advantageous to speeding up of scanning.

The mutual distance Se of an I number of openings which exist at the same position in the scanning direction is given by following expression (8):

$$PSe/I-\text{INT}(PSe/I)>0 \quad (8)$$

where INT(A) indicates an integer portion of A.

Expression (8) means that PSe is not a multiple of I, and shows conditions for performing a so-called dense scan. The "dense scan" means the state without any absence of scanning line.

Figure 7:
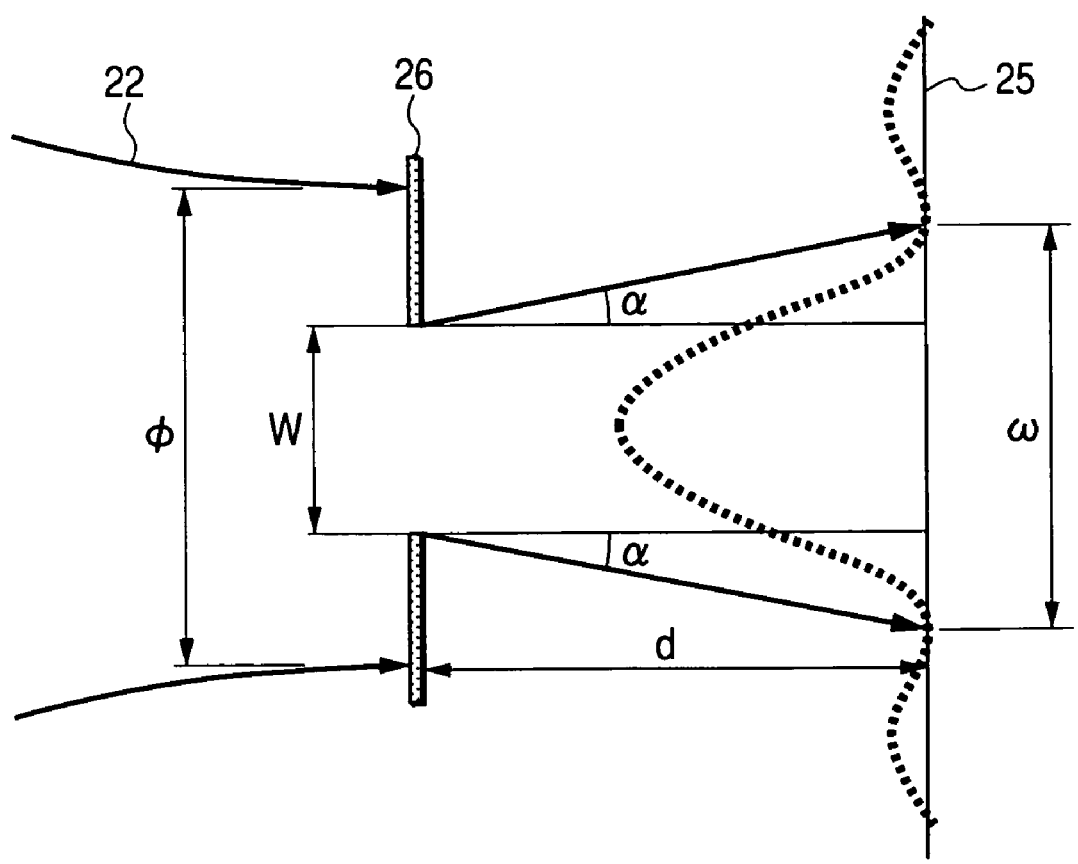
FIG. 7 is a diagram showing diffraction of a light beam which is partly blocked.

FIG. 7 shows a state where a light beam which is partly blocked by the member 26 having openings is spread by diffraction. When the diameter of an opening formed in the member having openings is indicated by W, the wavelength of the light beam is indicated by λ, and the distance between the member having openings and the medium to be scanned is indicated by d, it is known that the spread angle α due to diffraction after passing through the opening is given by following expression (10) while considering the angle as an angle forming a first dark ring:

$$\sin \alpha = \lambda/2W \quad (10)$$

When the beam diameter due to the diffraction after passing through the opening is allowed to, at the maximum, be SQRT(2) times the diameter W of the opening, d is given by following expression (9):

$$d \leq ((SQRT(2)-1)W^2)/\lambda \quad (9)$$

Figure 1:
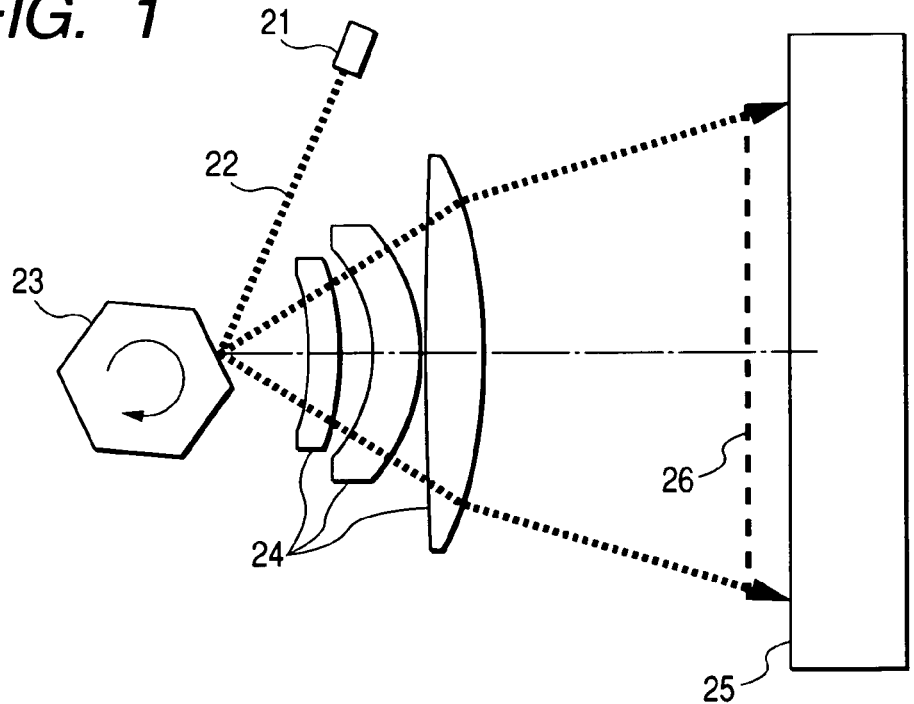
FIG. 1 is a diagram showing an optical scanning apparatus.

Next, an experimental example of the invention will be described with reference to FIG. 1.

Data are listed in Table 1. In the table, surface number 1 indicates the reflecting surfaces of the rotary polygon mirror, surface numbers 2 to 7 indicate the six surfaces of the Fθ lens 24 consisting of the three lenses, surface number 8 indicates the member having openings, and surface number 9 indicates the surface of the photosensitive drum. The specifications of Examples 1 to 4 are shown in Table 2.

TABLE 1

| Surface number | Radius of curvature | Distance between faces | Index of refraction |
| --- | --- | --- | --- |
| 1 | ∞ | 40.3 | 1.0 |
| 2 | −73 | 6.1 | 1.649 |
| 3 | −100 | 16.3 | 1.0 |
| 4 | −183.7 | 15.9 | 1.758 |
| 5 | −116.1 | 4.9 | 1.0 |
| 6 | ∞ | 25 | 1.758 |
| 7 | −200 | 263.5 | 1.0 |
| 8 | ∞ | 1.0 | 1.0 |
| 9 | ∞ | | |

| | | | | |
| --- | --- | --- | --- | --- |
| P: Dot density | | 600 dpi | | |
| L: Scan width | | 12 inch | | |
| λ: Wavelength of light beam | | 680 nm | | |
| Number of surfaces of rotary polygon mirror | | 6 | | |
| Radius of inscribed circle of rotary polygon mirror | | 26 mm | | |
| Incidence angle of light beam on rotary polygon mirror | | 1.19 rad | | |
| K: Number of light beams | 1 | 4 | 4 | 4 |
| Shape of opening | | 1. 2/600 inchφ | | |
| M: Number of rows along which openings are arranged | 1 | 4 | 4 | 4 |
| I: Number of openings having same scanning-direction coordinate | 1 | 1 | 1 | 2 |
| N: Total number of openings | 7201 | 7201 | 7201 | 14402 |
| Distance of openings in scanning direction | 1/600 inch | 1/600 inch | 1/600 inch | 1/600 inch |
| Su: Distance of openings having different scanning-direction coordinate, in sub-scanning direction | | 1/600 inch | 2/600 inch | 2/600 inch |
| Su: Distance of openings having same scanning-direction coordinate, in sub-scanning direction | | | | 5/600 inch |

In the above, the single optical scanning apparatus has been exemplarily described. In some example, a multi-color image forming apparatus is configured by using a plurality of optical scanning apparatuses. In order to enhance the color reproducibility, the diameters of imaging light beams of the optical scanning apparatuses must be uniformalized. The invention is further effective as means for realizing this.

In the embodiment described above, the intensity distribution of a light beam is not mentioned. Not only a light beam approximated by the Gaussian distribution, but also a Bessel beam can be used. It is possible to obtain a function of blocking a sidelobe which is produced outside a first dark ring, and which is problematic in a Bessel beam, in the scanning direction and the sub-scanning direction.

What is claimed is:

1. An optical scanning apparatus comprising:
   a deflecting member that deflects and scans a light beam emitted from a light source;
   an optical element that receives the light beam deflected from the deflecting member and scans and images the light beam on a medium to be scanned; and
   an opening member disposed between the optical element and the medium to be scanned, the opening member restricting a scanning direction of the scanned and imaged light beam and a direction perpendicular to the scanning direction.

2. An optical scanning apparatus according to claim 1, wherein a scan width L on the medium to be scanned, a dot density P, and a total number N of openings in the opening member satisfy a following relationship;

$$N=LP+1.$$

3. An optical scanning apparatus according to claim 1, wherein a number K of the light beam, and a number M of a row on the opening member along which an opening is arranged satisfy a following relationship of;

$$K=M.$$

4. An optical scanning apparatus according to claim 3, wherein a mutual distance Su between the M row along which the opening is arranged, and a dot density P satisfies a following relationship of;

$$Su=m/P$$

where m is an integer of 2 or more.

5. An optical scanning apparatus according to claim 1, wherein a scan width L on the medium to be scanned, a dot density P, and a total number N of the opening satisfy a following relationship of;

$$N=\eta(LP+1)$$

where η is an integer of 2 or more.

6. An optical scanning apparatus according to claim 5, wherein a number K of the light beam, and a number M of the row along which the opening is arranged satisfy a following relationship of;

$$K=M \text{ and } M=J\eta$$

where J is an integer of 2 or more.

7. An optical scanning apparatus according to claim 3, wherein a number I of opening which is arranged in the opening member, and which have a same scanning-direction coordinate satisfies a following relationship of;

$$I=\eta.$$

8. An optical scanning apparatus according to claim 7, wherein a mutual distance Se of the I number of the opening which is arranged in the opening member, and which have a same scanning-direction coordinate is given by $$PSe/\eta-INT(PSe/\eta)>0$$

where INT(A) indicates an integer portion of A.

9. An optical scanning apparatus according to claim 1, wherein a width W of each opening disposed in the opening member, a wavelength λ of the light beam, and a distance d between the opening member and the medium to be scanned are given by $$d \leq ((SQRT(2)-1)W^2)/\lambda.$$

10. An optical scanning apparatus according to claim 1, wherein intensity distribution of the light beam scanned and imaged on the opening member is approximated by a square of a 0th order Bessel distribution.

11. An optical scanning apparatus according to claim 1, wherein widths W of the opening disposed in the opening member are equal to each other in the scanning direction and the direction perpendicular to the scanning direction.

12. An image forming apparatus comprising:
   an optical scanning apparatus according to claim 1.

13. An image forming apparatus comprising:
   a plurality of optical scanning apparatuses according to claim 1.

14. An optical scanning apparatus according to claim 1, wherein the opening member restricts the light beam before the light beam is imaged on the medium to be scanned.

15. An optical scanning apparatus according to claim 1, wherein the opening member comprises a plurality of light beam reducing portions having diameters that are equalized in a scanning direction and a sub-scanning direction.

16. An optical scanning apparatus according to claim 1, wherein the opening member comprises a plurality of light blocking portions, such that a diameter of the light beam reaching the medium to be scanned is smaller than a diameter of the light beam incident on the opening member.

17. An optical scanning apparatus according to claim 15, wherein an amount of the plurality of light reducing portions N on the opening member equals a scan width of the light beam L×a dot density P of an image to be scanned+1.

* * * * *